United States Patent [19]

Kunii et al.

[11] 3,989,481
[45] Nov. 2, 1976

[54] CONTINUOUS CATALYTIC GASIFICATION OF HEAVY HYDROCARBON OILS WITH RECIRCULATED FLUIDIZED CATALYST

[76] Inventors: Daizo Kunii, 1-25-16, Nakamachi, Meguro, Tokyo; Taiseki Kunugi, 7-17-22-903, Roppongi, Minato, Tokyo, both of Japan

[22] Filed: Apr. 24, 1974

[21] Appl. No.: 463,832

[30] Foreign Application Priority Data
Apr. 24, 1973 Japan.................................. 48-45673

[52] U.S. Cl. ............................... 48/215; 48/214 A; 23/288 S
[51] Int. Cl.² ........................................... C01B 2/14
[58] Field of Search...................... 48/214, 211, 215; 23/288 S

[56] References Cited
UNITED STATES PATENTS

| | | | |
|---|---|---|---|
| 2,377,657 | 6/1945 | Watts | 23/288 S |
| 3,838,993 | 10/1974 | Aldridge | 48/214 |
| 3,838,994 | 10/1974 | Aldridge | 48/214 |

*Primary Examiner*—R.E. Serwin
*Attorney, Agent, or Firm*—Armstrong, Nikaido & Wegner

[57] ABSTRACT

A continuous catalytic gasification of heavy hydrocarbon oils with recirculated fluidized catalyst bed. More particularly, it relates to such a process for the gasification in which solid fluidized catalyst having an average particle size of 0.05 to 2mm is recirculated through reaction and regeneration columns in a dense fluidized state, and wherein a heavy hydrocarbon feed stock is contacted with the fluidized catalyst and thermally decomposed and gasified at a temperature of 650° to 1,000° C.

6 Claims, 3 Drawing Figures

CONTINUOUS CATALYTIC GASIFICATION OF HEAVY HYDROCARBON OILS WITH RECIRCULATED FLUIDIZED CATALYST

Topped crude oils, vacuum residual oils and other heavy oils from refineries, coal tar and tar sand oil are valuable and important resources, from which fuel gases, hydrogen or carbon monoxide may be prepared. Economical processes for the complete gasification of such heavy oils have been longed for. One of the known processes for the complete gasification of heavy oils involves partial combustion of the oil in a mixed stream of oxygen and steam. This process suffers from such drawbacks that since cokes particles produced from droplets of heavy oil stay in a reactor for but a short period of time a substantial proportion of the cokes particles leave the reactor unreacted; and that the use of oxygen for the partial combustion raises the manufacturing cost of gases. A process wherein a finely divided refractories or cokes are fluidized by employing of oxygen or steams; and into the fluidized or spouted bed of the above, a heavy oil to be gasified is introduced in the mistified state, whereby the energy required for the gasification is supplied by the partial combustion of said heavy oil, is also known. It is similarly difficult with the latter process to reduce a manufacturing cost of gases owing to the fact that this process also use oxygen in a reactor.

A primary object of the invention is to provide an economical continuous process for the production of fuel gases by the complete gasification of heavy oils without using oxygen in the gasification zone, by means of which process a manufacturing cost of gases in terms of cost per unit heat of combustion of the gases is significantly low when compared that obtainable with the prior art processes.

In accordance with the invention we provide continuous catalytic gasification of heavy oils with recirculated fluidized catalyst bed which comprises the steps of fluidizing heated solid particulate catalyst for the gasification of heavy oils having an average particle size of 0.05 to 2mm with steam to form a first fluidized catalyst bed, passing said heated catalyst through said first bed in a densely fluidized state from the bottom upwardly to the top of said first bed, introducing heavy oil and steam into said first bed at lower portions thereof, thereby contacting said heavy oil and said steam with said fluidized catalyst to effect gasification of the oil at a temperature of 650° to 1,000° C, passing the spent catalyst from the top of said first bed to the bottom of a second fluidized catalyst bed which is formed by fluidizing the spent catalyst from said first bed with steam or with a mixture of steam and air, passing said spent catalyst through said second fluidized bed in a densely fluidized state from the bottom upwardly to the top of said second bed, introducing air or a mixture of air and fuel or a hot combustion gas into said second bed, thereby heating said spent catalyst to such a temperature that a temperature within the range between 650° and 1,000° C may be maintained in said first bed and regenerating the catalyst by burning off any carbonaceous material deposited on the spent catalyst, passing said heated and regenerated catalyst from the top of said second bed to the bottom of said first bed for re-use, and withdrawing the gasified product from said first bed.

The invention will be described with reference to the attached drawings in which.

Figure 1:
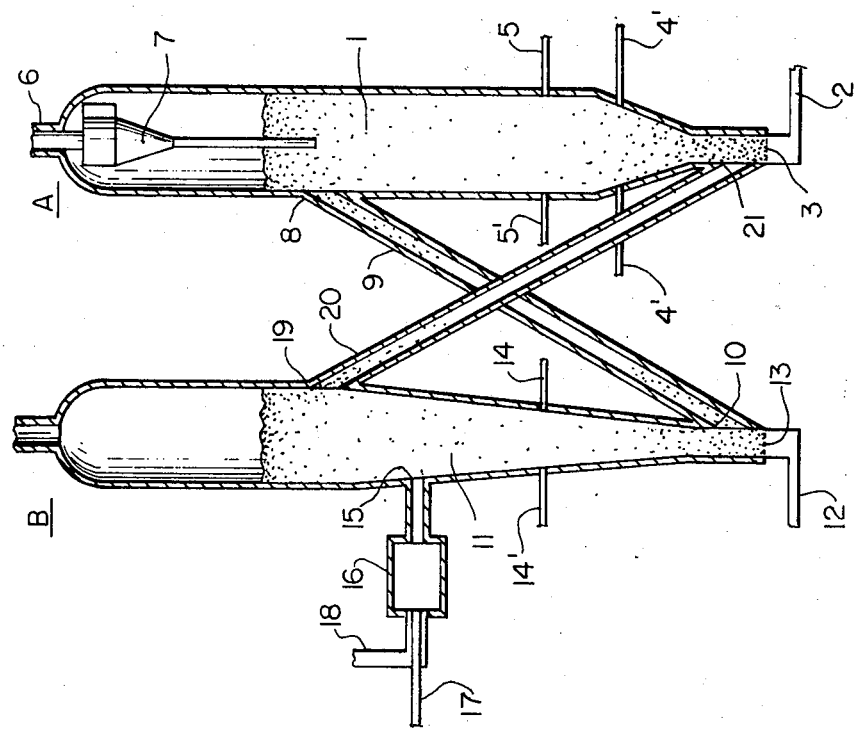
FIG. 1 is a schematic longitudinal cross-sectional view of an apparatus which may be employed in the practice of the invention.

Referring to FIG. 1, the shown apparatus comprises upright generally cylindrical reaction column A and upright generally cylindrical regeneration column B having downwardly decreasing diameters, in each of said colums A and B a dense fluidized bed of solid particulate catalyst for gasification of heavy oil having an average size of 0.05 to 2mm being formed. The top of the fluidized bed formed in reaction column A and the top of the fluidized bed formed in regeneration column B are communicated through respective ducts 9 and 20 with the bottom of regeneration column B and the bottom of reaction column A, respectively.

Numerical 1 designates the fluidized catalyst bed formed in reaction column A, in which the catalyst is fluidized with steam, which is introduced through inlet 2 and regulator 3 into reaction column A at the bottom thereof, and is passed through bed 1 from the bottom upwardly to the top thereof. The height of the fluidized catalyst bed in reaction column A should preferably be at least 2 times as much as the maximum diameter of column A. The heavy oil feed stock to be gasified is mistified preferably with steam and introduced through inlets 4, 4' . . . into fluidized bed 1 at lower portions thereof. While we prefer to provide a plurality of inlets symmetrically and to introduce the heavy oil therethrough inwardly into the reaction column, a number of inlets 4, 4' . . . provided at one level is not critical and one or more additional sets of inlets, such as those 5, 5' . . . shown in FIG. 1 may be provided at other levels. A number of the inlets at each level, a number of such levels as well as locations and directions of the inlets may adequately be selected in accordance with a design known per se for the maintenance of the desired conditions in reaction column A.

The heavy oil feed stock introduced into fluidized bed 1 is catalytically gasified while maintaining the fluidized bed at temperatures ranging between 650° and 1,000° C and, the gas so produced together with unreacted steam leaving fluidized bed 1 is discharged from outlet 6 of reaction column A and passed to subsequent steps. Any accompanied finely devided catalyst and carbon particles leaving the fluidized bed may be collected in a suitable collector, such as cyclone 7, provided at the upper portion of reaction column A, and continuously fed back to fluidized bed 1. It is not necessary to locate such a collector inside the reaction column. It may be located just outside outlet 6.

While a carbonaceous material is usually deposited onto the particles of the catalyst during the gasification in the fluidized bed 1, a substantial proportion of the deposited carbon will be consumed in reaction column A. The spent particulate catalyst is passed through opening 8 provided in the proximity of the top of fluidized bed 1 into duct 9, travels downwardly therethrough predominantly by its own weight, and is introduced through opening 10 provided at the bottom of regeneration column B into fluidized bed 11 at the bottom thereof. In bed 11 the catalyst is fluidized with steam, which is introduced through inlet 12 and regulator 13 into regeneration column B at the bottom thereof, and is passed through bed 11 from the bottom upwardly to the top thereof. If desired, the fluidization of bed 11 may be aided by introducing air and/or additional steam through inlets 14, 14'... provided in the side wall of column B at a suitable level. The catalyst ascending through fluidized bed 11 in regeneration column B is contacted with fuel and air or with a hot combustion gas introduced into fluidized bed 11 at the upper portion thereof through inlet 15 provided in the side wall of regeneration column B, whereby the catalyst is heated and a carbonaceous material deposited thereon, if any, is burnt off. Numerical 16 designates a combustion chamber wherein a fuel oil supplied through inlet 17 is burnt with air supplied through inlet 18 to produce a hot combustion gas which is introduced through inlet 15 into fluidized bed 11, as described above. This combustion chamber is utilized upon starting up the operation or when the catalyst introduced into fluidized bed 11 has a relatively small amount of carbonaceous material deposited thereon. In a steady operation with a certain heavy oil feed stock, wherein the catalyst introduced into fluidized bed 11 has a substantial amount of carbonaceous material deposited thereon, the supply of fuel from inlet 17 may be stopped or reduced. Inlet 15, combustion chamber 16 and inlets 17 and 18 represent but an embodiment for performing the function as described above, the designs and numbers thereof are not critical.

The particulate catalyst regenerated and heated in fluidized bed 11 in regeneration column B is passed through opening 19 provided regeneration column B in the promixity of the top of fluidized bed 11 into duct 20, travels downwardly therethrough predominantly by its own weight, and is introduced through opening 21 provided at the bottom of reaction column A into fluidized bed 1 at the bottom thereof. The catalyst is then fluidized with steam introduced through regulator 3, as already described, and while being passed upwardly through fluidized bed 1, it supplies the heat energy required for the gasification and promotes the reaction. Since the particulate catalyst employed in the process of the invention is recirculated through reaction column A and regeneration column B, it participates in the gasification of heavy oil in the state of having a sufficient activity and supplies the heat energy required for the gasification.

Figure 3:
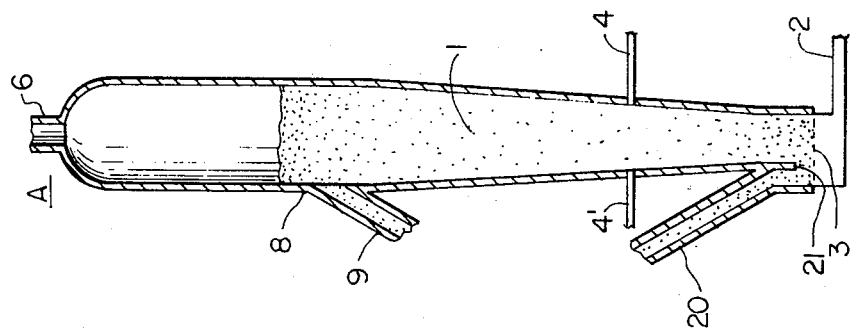
FIG. 3 is a schematic longitudinal cross-sectional view of still another reaction column which may be used in the practice of the invention.
Figure 2:
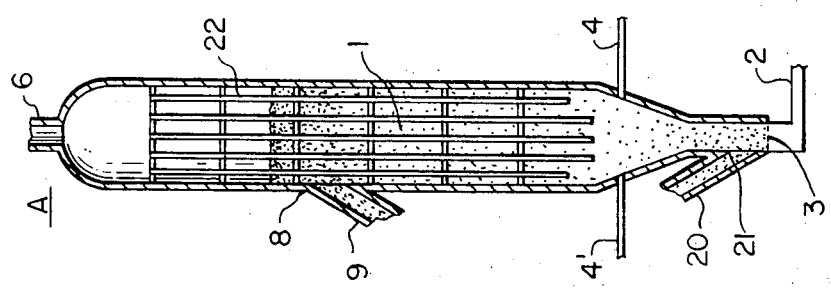
FIG. 2 is a schematic longitudinal cross-sectional view of another reaction column which may be employed in the practice of the invention.

FIG. 1 represents one embodiment of the apparatus which may be used in the practice of the invention. It should be appreciated that the construction of reaction column A which may be used is not limited to that shown in FIG. 1. For example, internals 22 may be disposed inside the reaction column, as shown in FIG. 2, which will assist the maintenance of desired fluidizing conditions. Further, it is not necessary that reaction column A is generally cylindrical. It may have upwardly increasing diameters, as shown in FIG. 3. FIG. 3 also illustrates another type of opening 21 which communicats duct 20 with the bottom of reaction column A.

Any solid particulate catalysts suitable for use in the gasification of heavy oil may be employed in the process of the invention. Examples of the catalysts include, for example, neutral refractories, such as alumina and chromia; basic refractories, such as magnesia clinker and chrome-magnesite brick; calcium oxide catalysts, such as lime-magnesia and lime-alumina; and iron oxide catalysts and nickel catalysts, such as nickel-magnesia, nickel-dolomite and nickel-kaolinite. These catalysts are known in the art as suitable for use in the production of fuel gas from crude oil, diesel oil, distilate and the like, and are used in cyclic gasifiers with regenerative fixed bed.

However, in catalytic gasifiers with regenerative fixed bed, feed oils which may be gasified are usually limited to those having a Conradson carbon residue of less than 10%. If a heavy oil, such as a reduced pressure residual oil of Khafji crude having a Conradson carbon residue as high as 25%, is gasified with a fixed catalyst bed, the catalyst bed is clogged with deposited carbon within a short period of time and it becomes impossible to continue the operation any more. This is because with such an oil a rate of deposition of a carbonaceous material is faster than a rate of gasification. With even feed oils having a Conradson carbon residue of 5 to 10%, thoughtful consideration should be taken to maintain a sufficiently high reaction temperature in order to increase a rate of gasification of carbonaceous material. Accordingly, feed oils having a Conradson carbon residue as low as possible is preferencially employed in the gasification of crude or diesel oils.

In accordance with the invention, heavy oils, such as the abovementioned reduced pressure residual oil, can readily and successfully gasified. When such heavy oils are processed in accordance with the invention, a deposited carbonaceous material is first attached to the particulate catalyst in fluidized state by introducing mistified heavy oil, and then consumed for the water gas reaction with steam in the reaction column. Even in the case wherein the deposited carbonaceous material is not exhaustively consumed for the water gas reaction, any residual carbon on the catalyst is burnt with air in the regeneration column. Thus, in accordance with the process of the invention can be gasified various feed oils ranging from those having an extremely high Conradson carbon residue, such as the abovementioned reduced pressure residual oil of Khafji crude to those having a low Conradson carbon residue.

Upon the gasification of petroleum, in addition to the carbonaceous material, a tar-like material is also generally by-produced. The heavier the oil is, the more both carbonaceous and tar-like materials are by-produced. This tar-like material also reacts with steam to produce a water gas, as is the case with the carbonaceous material. In the prior art processes, wherein the gasification is carried out in a gasifier with regenerative fixed bed, the catalysts employed are relatively large, e.g. balls and Raschig rings of the size of 10 to 35mm, providing a relatively small surface area of catalyst per unit volume of reactor and, therefore, the conversion of tar-like material to water gas is usually low, thus a substantial amount of tar remains unreacted upon the gasification of heavy oil.

In accordance with the invention the process is carried out with a fluidized bed of finely divided catalyst having an average particle size of 0.05 to 2mm which provides a remarkably large surface area of catalyst per unit volume of reactor and, therefore, the conversion of tar-like material to water gas is very high, thus the proportion of tar leaving the reactor unreacted is very low even if a heavy oil feed stock is gasified.

Since such a mechanism operates in the process of the invention, any hydrocarbon oils which are capable of being introduced into the reactor in the mistified or vaporized form, including naphtha, kerosene, light oil, normal or reduced pressure residual oil, crude oil, tar sand oil and shale oil may be processed in accordance with the invention. Thus, especially remarkable results are obtainable when heavy oils having a relatively high Conradson carbon residue are processed in accordance with the invention.

In the gasification with fluidized bed according to the invention, recirculation of catalyst may be performed very stably and, controlling of rate of catalyst recirculation and of temperatures of reaction and regeneration columns are readily carried out. Further, since the heating and regeneration of the catalyst, and the gasification are carried out in respective columns, the production of gas can be continuous, instead of intermitent as is the care with fixed bed. Moreover, the process of the invention may easily be practiced in a large scale, which makes it possible to reduce a cost of gas produced to a great extent.

The invention will be further described by the following examples, in which various heavy oils were gasified using an apparatus similar to that shown in FIG. 1.

EXAMPLE 1

An employed gasifier with recirculated, fluidized bed was as follows:

Reaction column:
 Maximum diameter, 105mm;
 Diameter at the bottom thereof, 21mm;
 Height, 1,500mm;
Regeneration column:
 Maximum diameter, 105mm;
 Diameter at the bottom thereof, 21mm;
 Height, 1,500mm Height of fluidized bed in reaction column at a steady state: 550mm. The apparatus was charged with a particulate chrome-magnesite refractory having an average particle size of 0.25mm and a normal pressure residual oil having a Conradson carbon residue of 4.1% was gasified under the following conditions:

| | |
|---|---|
| Rate of feeding of stock oil | 350 g/hr |
| Rate of feeding of steam into reaction column | 380 g/hr |
| Rate of catalyst recirculation | 14 kg/hr |
| Temperature of fluidized bed in reaction column (at the top thereof) | 800° C |
| Temperature of fluidized bed in regeneration column (at the top thereof) | 890° C |

The results obtained are shown in Table 1 below. For a comparative purpose, the procedure was repeated except that the chrome-magnesite catalyst was replaced with a particulate chamotte refractory which has no catalytic activity with the other conditions remaining substantially the same. The results obtained are also shown in Table 1.

Table 1

| Catalyst | Chrome-magnesite | Chamotte |
|---|---|---|
| Amount of gas produced (Nm$^3$/kg) | 0.88 | 0.67 |
| Heat of combustion of the gas produced (Kcal/Nm$^3$) | 6,930 | 8,170 |
| Amount of tar by-produced (Kg/Kg) | 0.08 | 0.18 |
| Composition of the gas produced (% by volume) | | |
| $H_2$ | 44.4 | 35.1 |
| CO | 9.3 | 3.0 |
| $CH_4$ | 25.8 | 32.9 |
| $C_mH_n$ | 17.7 | 27.0 |
| $CO_2$ | 2.8 | 2.0 |

EXAMPLES 2 to 5

Using the gasifier as described in Example 1, various heavy oils were gasified with lime catalysts and nickel catalysts under the conditions indicated in Table 2. The lime-bauxite catalyst employed in Example 2 was prepared by calcining a mixture of 25 parts by weight of calcium carbonate, 72 parts by weight of bauxite and 3 parts by weight of bentonite (as an excipient) at a temperature of 1,350° C for 15 hours and dividing the calcined product. The lime-magnesia catalyst employed in Example 3 was prepared by calcining a mixture of 10 parts by weight of calcium carbonate, 85 parts by weight of magnesia and 5 parts of bentonite at a temperature of 1,100° C for 7 hours and dividing the calcined product. The nickel-alumina catalyst employed in Example 4 was prepared by impregnating a particulate porous alumina with a 20% aqueous solution of nickel nitrate and heating the alumina so impregnated to decompose the nickel nitrate to nickel oxide. The so-prepared catalyst contained 5.2% by weight of nickel. The nickel-dolomite catalyst employed in Example 5 was prepared by impregnating a particulate dolomite with a 20% aqueous solution of nickel nitrate and heating the impregnated dolomite to decompose the nickel nitrate to nickel oxide. The catalyst so obtained carried 2.5% by weight of nickel.

Table 2

| Example No. | 2 | 3 | 4 | 5 |
|---|---|---|---|---|
| Catalyst | lime-bauxite | lime-magnesia | nickel-dolomite | nickel-alumina |
| Feed oil | Khafji reduced pressure residual oil | Khafji reduced pressure residual oil | Kuwait crude oil | Reduced pressure light oil |
| Conradson carbon residue | 24.2 | 24.2 | 5.9 | 1.3 |
| Water/Feed oil (Kg/Kg) | 1.22 | 0.65 | 0.81 | 1.05 |
| Temp. of fluidized bed in reaction column at the top (° C) | 910 | 755 | 850 | 720 |
| Temp. of fluidized bed in regeneration column at the top (° C) | 975 | 840 | 925 | 810 |
| Amount of gas produced (Nm$^3$/Kg) | 1.63 | 0.74 | 1.41 | 1.06 |
| Heat of combustion of the gas produced (Kcal/Nm$^3$) | 5,250 | 7,460 | 6,160 | 9,610 |

Table 2-continued

| Example No. | 2 | 3 | 4 | 5 |
|---|---|---|---|---|
| Catalyst | lime-bauxite | lime-magnesia | nickel-dolomite | nickel-alumina |
| Feed oil | Khafji reduced pressure residual oil | Khafji reduced pressure residual oil | Kuwait crude oil | Reduced pressure light oil |
| Amount of tar by-produced (Kg/Kg) | 0.04 | 0.17 | 0.03 | 0.01 |

What we claim is:

1. A continuous catalytic gasification of heavy oils with recirculated fluidized catalyst bed which comprises the steps of fluidizing heated solid particulate catalyst for the gasification of heavy oils having an average particle size of 0.05 to 2mm with steam to form a first fluidized catalyst bed, passing said heated catalyst through said first bed in a densely fluidized state from the bottom upwardly to the top of said first bed, introducing a heavy oil and steam into said first bed at lower portions thereof, thereby contacting said heavy oil and said steam with said fluidized catalyst to effect gasification of the oil at a temperature of 650° to 1,000° C, passing the spent catalyst from the top of said first bed to the bottom of a second fluidized catalyst bed which is formed by fluidizing the spent catalyst from said first bed with steam or with a mixture of steam and air, passing said spent catalyst through said second fluidized bed in a densely fluidized state from the bottom upwardly to the top of said second bed, introducing air or a mixture of air and fuel or a hot combustion gas into said second bed, thereby heating said spent catalyst to such a temperature that a temperature within the range between 650° and 1,000° C may be maintained in said first bed and regenerating the catalyst by burning off any carbonaceous material deposited on the spent catalyst, passing said heated and regenerated catalyst from the top of said second bed to the bottom of said first bed for re-use, and withdrawing the gasified product from said first bed.

2. A continuous catalytic gasification of heavy oils with recirculated fluidized catalyst bed in accordanced with claim 1, wherein each of said first and second fluidized catalyst beds has an upright, generally cylindrical configuration.

3. A continuous catalytic gasification of heavy oils with recirculated fluidized catalyst bed in accordance with claim 2, wherein said generally cylindrical configuration of each bed has a height of at least two times as much as the maximum diameter.

4. A continuous catalytic gasification of heavy oils with recirculated fluidized catalyst bed in accordance with claim 3, wherein said generally cylindrical configuration of at least second bed has upwardly increasing diameters.

5. A continuous catalytic gasification of heavy oils with recirculated fluidized catalyst bed in accordance with claim 4, wherein the recirculation of the catalyst is carried out in such a manner that the catalyst is passed through a confined path from the top of one bed to the bottom of another bed predominantly by its own weight.

6. A continuous catalytic gasification of heavy oils with recirculated fluidized catalyst bed in accordance with any one of the preceding claims, wherein the heavy oils to be gasified has a Conradson carbon residue of at least 10%.

* * * * *